(12) United States Patent
Tapia

(10) Patent No.: US 10,142,242 B2
(45) Date of Patent: Nov. 27, 2018

(54) NETWORK SUPPORT NODE TRAFFIC REDUCTION FOR SELF-ORGANIZING NETWORKS

(71) Applicant: T-Mobile USA, Inc., Bellevue, WA (US)

(72) Inventor: Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/277,389

(22) Filed: May 14, 2014

(65) Prior Publication Data

US 2014/0250201 A1    Sep. 4, 2014

Related U.S. Application Data

(63) Continuation-in-part of application No. 13/831,082, filed on Mar. 14, 2013.
(Continued)

(51) Int. Cl.
*H04L 12/851* (2013.01)
*H04L 12/24* (2006.01)

(52) U.S. Cl.
CPC ............ *H04L 47/24* (2013.01); *H04L 41/082* (2013.01); *H04L 41/0816* (2013.01); *H04L 41/0886* (2013.01); *H04L 41/20* (2013.01)

(58) Field of Classification Search
CPC ..... H04W 24/02; H04W 24/08; H04W 84/18; H04W 84/045; H04W 24/00; H04W 52/02; H04W 52/243; H04W 72/0413; H04W 36/0083; H04W 28/08; H04L 41/0816; H04L 41/0823; H04L 41/0886; H04L 41/0893; H04L 41/5019; H04L 41/022; H04L 41/0233; H04L 41/04; H04L 41/20; H04L 47/24; H04L 29/12066;
(Continued)

(56) References Cited

U.S. PATENT DOCUMENTS

2002/0158897 A1    10/2002    Besaw et al.
2005/0007993 A1    1/2005    Chambers et al.
(Continued)

FOREIGN PATENT DOCUMENTS

CN    103227995        7/2013
EP    2403290 A1    1/2012
(Continued)

OTHER PUBLICATIONS

Movehedi, et al., "A Survey of Autonomic Network Architentures and Evaluation Criteria", IEEE Communications Surveys & Tutorials, vol. 14, No. 2, May 2012, pp. 464-490.
(Continued)

*Primary Examiner* — Nicholas R Taylor
*Assistant Examiner* — Michael Li
(74) *Attorney, Agent, or Firm* — Lee & Hayes, PC

(57) ABSTRACT

Described herein are techniques for limiting transmission of plurality of messages from one or more self-organizing network (SON) tools to a network support node based at least in part on performance information and on either or both of priorities associated with the plurality of messages or priorities associated with the SON tool(s). The performance information is associated with performance of a network support node.

20 Claims, 6 Drawing Sheets

Related U.S. Application Data

(60) Provisional application No. 61/695,212, filed on Aug. 30, 2012.

(58) Field of Classification Search
CPC ............ H04L 29/12226; H04L 41/044; H04L 47/10; H04L 61/1511; H04L 61/2015; H04L 41/06; H04L 41/069; H04L 41/082; H04Q 3/0029
See application file for complete search history.

(56) References Cited

U.S. PATENT DOCUMENTS

| | | | |
|---|---|---|---|
| 2005/0165906 | A1 | 7/2005 | Deo et al. |
| 2008/0139197 | A1 | 6/2008 | Misra et al. |
| 2009/0006010 | A1 | 1/2009 | Van Sloun et al. |
| 2009/0216881 | A1 | 8/2009 | Lovy et al. |
| 2009/0257353 | A1 | 10/2009 | Song et al. |
| 2010/0016034 | A1 | 1/2010 | Lindqvist et al. |
| 2010/0020699 | A1* | 1/2010 | On .............................. 370/241.1 |
| 2010/0100758 | A1 | 4/2010 | Houmaidi |
| 2010/0150150 | A1* | 6/2010 | Paz ......................... H04L 47/10 370/389 |
| 2010/0299419 | A1* | 11/2010 | Ramankutty ......... H04W 24/02 709/221 |
| 2010/0325267 | A1* | 12/2010 | Mishra et al. ................. 709/224 |
| 2011/0009105 | A1 | 1/2011 | Lee et al. |
| 2011/0010751 | A1 | 1/2011 | Soulhi |
| 2011/0053587 | A1* | 3/2011 | Turk et al. .................... 455/423 |
| 2011/0083138 | A1 | 4/2011 | Sivasubramanian et al. |
| 2011/0171952 | A1 | 7/2011 | Niu |
| 2011/0261721 | A1* | 10/2011 | Zhou et al. .................... 370/254 |
| 2011/0265011 | A1 | 10/2011 | Taylor et al. |
| 2011/0286337 | A1* | 11/2011 | Olsson ....................... 370/241.1 |
| 2011/0300871 | A1 | 12/2011 | Dottling et al. |
| 2012/0039175 | A1 | 2/2012 | Sridhar et al. |
| 2012/0059923 | A1* | 3/2012 | Cleary ................... H04W 24/00 709/223 |
| 2012/0079066 | A1 | 3/2012 | Li et al. |
| 2012/0144038 | A1 | 6/2012 | Hildebrand |
| 2012/0146799 | A1 | 6/2012 | Bell et al. |
| 2012/0166008 | A1 | 6/2012 | Jeong |
| 2012/0170478 | A1 | 7/2012 | Doettling et al. |
| 2012/0179822 | A1 | 7/2012 | Grigsby et al. |
| 2012/0213057 | A1 | 8/2012 | Zhang et al. |
| 2012/0307697 | A1 | 12/2012 | Mukhopadhyay |
| 2012/0320766 | A1 | 12/2012 | Sridhar |
| 2013/0104173 | A1 | 4/2013 | Tjio et al. |
| 2013/0189941 | A1 | 7/2013 | Abbott et al. |
| 2013/0242720 | A1* | 9/2013 | Chou .................. H04W 52/243 370/221 |
| 2013/0257623 | A1 | 10/2013 | Bagasra |
| 2013/0294286 | A1 | 11/2013 | Schmelz et al. |
| 2013/0305322 | A1 | 11/2013 | Raleigh et al. |
| 2014/0031006 | A1 | 1/2014 | Moore et al. |
| 2014/0040450 | A1* | 2/2014 | Sanneck ................. H04L 41/04 709/223 |
| 2014/0068034 | A1 | 3/2014 | Tapia |
| 2014/0086073 | A1 | 3/2014 | Baykal et al. |
| 2014/0229210 | A1 | 8/2014 | Sharifian et al. |
| 2014/0250201 | A1 | 9/2014 | Tapia |
| 2014/0331277 | A1 | 11/2014 | Frascadore et al. |
| 2014/0355439 | A1 | 12/2014 | Kakadia |
| 2014/0355484 | A1 | 12/2014 | Foster et al. |
| 2015/0023209 | A1* | 1/2015 | Gunnarsson .......... H04W 24/02 370/254 |
| 2015/0026327 | A1* | 1/2015 | Tang .................... H04L 41/044 709/223 |
| 2015/0050925 | A1 | 2/2015 | Tapia |
| 2015/0146675 | A1 | 5/2015 | Zhang et al. |

FOREIGN PATENT DOCUMENTS

| | | |
|---|---|---|
| KR | 1020100047170 | 11/2011 |
| WO | WO2010132884 A1 | 1/2010 |
| WO | WO2013124435 | 8/2013 |
| WO | WO2014003770 | 1/2014 |
| WO | WO2014023347 | 2/2014 |

OTHER PUBLICATIONS

Nascimento, et al., "Virtual routers as a service: the RouteFlow approach leveraging software-defined networks", Proceedings of the 6th International Conference on Future Internet Technologies, Jun. 2011, pp. 34-37.

Office Action for U.S. Appl. No. 13/831,082, dated Apr. 6, 2015, Pablo Tapia, "Open Architecture for Self-Organizing Networks", 16 pages.

Panisson, et al., "Designing the Architecture of P2P-Based Network Management Systems", Proceedings of the 11th IEEE Symposium on Computers and Communications, Jun. 2006, 7 pgs.

The PCT Search Report and Written Opinion dated Dec. 2, 2013 for PCT application No. PCT/US13/57170, 10 pages.

Tirado, et al., "Affinity P2P: A self-organizing content-based locality-aware collaborative peer-to-peer network", Computer Networks 54, Jun. 1, 2010, pp. 2056-2070.

Final Office action for U.S. Appl. No. 13/831,082, dated Oct. 8, 2015, Tapia, "Open Architecture for Self-Organizing Networks", 17 pages.

Non-Final Office action for U.S. Appl. No. 14/496,185, dated Oct. 8, 2015, Inventor #1, "Self-Organizing Network Mechanism for Energy Saving During an Outage", 14 pages.

Office action for U.S. Appl. No. 14/278,271, dated Aug. 26, 2015, Tapia et al., "Special Events Module for Self-Organizing Networks", 10 pages.

The PCT Search Report and Written Opinion dated Aug. 10, 2015 for PCT application No. PCT/US2015/029518, 11 pages.

Yilmaz et al., "Analysis of Antenna Parameter Optimization Space for 3GPP LTE", Vehicular Technology Conference (VTC 2009-Fall), Sep. 2009, 6 pages.

The Extended European Search Report dated Apr. 6, 2016 for European patent application No. 13833979.1, 9 pages.

Office action for U.S. Appl. No. 14/496,185, dated Apr. 20, 2016, Tapia, "Self-Organizing Network Mechanism for Energy Saving During an Outage", 17 pages.

The PCT Search Report and Written Opinion dated Mar. 18, 2016 for PCT Application No. PCT/US2015/050740, 12 pages.

Scully, et al., "Measurements, Architecture and Interfaces for Self-Organizing Networks", Internet Citation, Oct. 31, 2010, pp. 1-47, retrieved from the internet at URL:http://www.fp7-socrates.eu/files/Deliverables/SOCRATES_D5.10%20Measurements,%20architecture%20and%20interfaces%20for%20self-organising%20networks.pdf, retrieved on Mar. 1, 2011.

Office action for U.S. Appl. No. 14/278,271, dated Dec. 10, 2015, Tapia et al., "Special Events Module for Self-Organizing Networks", 10 pages.

Office action for U.S. Appl. No. 14/278,271, dated Oct. 4, 2016, Tapia et al., "Special Events Module for Self-Organizing Networks", 12 pages.

Final Office action for U.S. Appl. No. 14/496,185, dated Nov. 4, 2016, Pablo Tapia, "Self-Organizing Network Mechanism for Energy Saving During an Outage", 23 pages.

The Chinese Office Action dated Sep. 5, 2016 for Chinese Patent Application No. 201380043793.9, a counterpart foreign application of U.S. Appl. No. 13/831,082, 34 pgs.

Office action for U.S. Appl. No. 13/831,082, dated Jul. 27, 2016, Tapia, "Open Architecture for Self-Organizing Networks", 24 pages.

Office Action for U.S. Appl. No. 14/612,962, dated Sep. 16, 2016, Zhang et al., "Performance-Based Optimization of QoS Factors", 17 pages.

The PCT Search Report and Written Opinion dated Jun. 29, 2016 for PCT application No. PCT/US2016/015184, 12 pages.

The European Office Action dated May 24, 2018 for European Patent Application No. 13833979.1, a counterpart foreign application of U.S. Appl. No. 13/831,082, 9 pages.

The Extended European Search Report dated Jun. 15, 2018 for European patent application No. 16747001.2, 9 pages.

(56) References Cited

OTHER PUBLICATIONS

Office Action for U.S. Appl. No. 14/278,271, dated May 18, 2018, Tapia, "Special Events Module for Self-Organizing Networks", 15 pages.

Office Action for U.S. Appl. No. 14/496,185, dated Jun. 25, 2018, Tapia, "Self-Organizing Network Mechanism for Energy Saving During an Outage", 22 pages.

Ilyoung Chong HUFS Korea (Republic of), "The output draft Supplement document of Y.son-ngn;TD891 (NGN-GSI)", ITU-T draft; study period 2009-2012, International Telecommunication Union, Geneva, CH, VO. 24/13, Feb. 16, 2012, pp. 1-32.

The Chinese Office Action dated Dec. 7, 2017 for Chinese patent application No. 201380043793.9, a counterpart foreign application of U.S. Appl. No. 13/831,082.

Translated Chinese Office Action dated May 12, 2017 for Chinese patent application No. 201380043793.9, a counterpart foreign application of U.S. Appl. No. 13/831,082, 31 pages.

The Extended European Search Report dated Jan. 18, 2018 for European patent application No. 15844457.0, 12 pages.

Office Action for U.S. Appl. No. 13/831,082, dated Jan. 13, 2017, Tapia, "Open Architecture for Self-Organizing Networks", 22 pages.

Office Action for U.S. Appl. No. 14/612,962, dated Sep. 1, 2017, Ting Zhang, "Performance-Based Optimization of QoS Factors", 19 pages.

Office Action for U.S. Appl. No. 14/278,271, dated Oct. 27, 2017, Tapia, "Special Events Module for Self-Organizing Networks", 19 pages.

Office Action for U.S. Appl. No. 14/496,185, dated Dec. 21, 2017, Tapia, "Self-Organizing Network Mechanism for Energy Saving During an Outage", 19 pages.

Office Action for U.S. Appl. No. 14/612,962, dated Mar. 20, 2018, Ting Zhang, "Performance-Based Optimization of QoS Factors", 25 pages.

Office Action for U.S. Appl. No. 14/278,271, dated Apr. 20, 217, Tapia, "Special Events Module for Self-Organizing Networks", 13 pages.

Office Action for U.S. Appl. No. 14/612,962, dated Apr. 20, 2017, Zhang et al., "Performance-Based Optimization of QoS Factors", 16 pages.

Office Action for U.S. Appl. No. 14/496,185, dated Jun. 1, 2017, Tapia, "Self-Organizing Network Mechanism for Energy Saving During an Outage", 26 pages.

* cited by examiner

NETWORK SUPPORT NODE TRAFFIC REDUCTION FOR SELF-ORGANIZING NETWORKS

RELATED APPLICATIONS

This patent application is a continuation-in-part of U.S. Non-provisional patent application Ser. No. 13/831,082, filed on Mar. 14, 2013, which claims priority filing benefit from U.S. Provisional Patent Application No. 61/695,212, filed Aug. 30, 2012. application Ser. Nos. 13/831,082 and 61/695,212 are hereby incorporated by reference, in their entirety.

BACKGROUND

Self-Organizing Networks (SON) are networks capable of any or all of automatic self-configuration, self-optimization, or self-healing. Recent developments of SON have centered on radio access networks, but any sort of network may be developed into an SON, such as a smart energy grid system or a medical health system. For radio access networks, such as telecommunication networks, self-configuration may include use of "plug-and-play" techniques for automatically configuring and integrating new base stations into the networks. Self-optimization includes automatic adjustments of base station parameters based on performance indicators. Self-healing may also involve automatic adjustments of base station parameters. For instance, a neighboring base station may be automatically re-configured to support users of a failed base station.

Tools have been developed for radio access networks implementing SON technologies. Such tools may include performance management tools, radio frequency (RF) planning tools, automatic frequency planning tools, rehoming tools, or automatic cell planning tools. Each of these tools is entirely self-contained and handles everything from interfacing directly with network components to retrieve measurements and configure parameters, to smart analysis of and decisions regarding measurements and configurations, to presentation of users of relevant information. Because each tool is self-contained while performing many of the same tasks, there is a great amount of redundancy across the tools, and a heightened burden on tool developers, thereby hindering adoption of SON.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
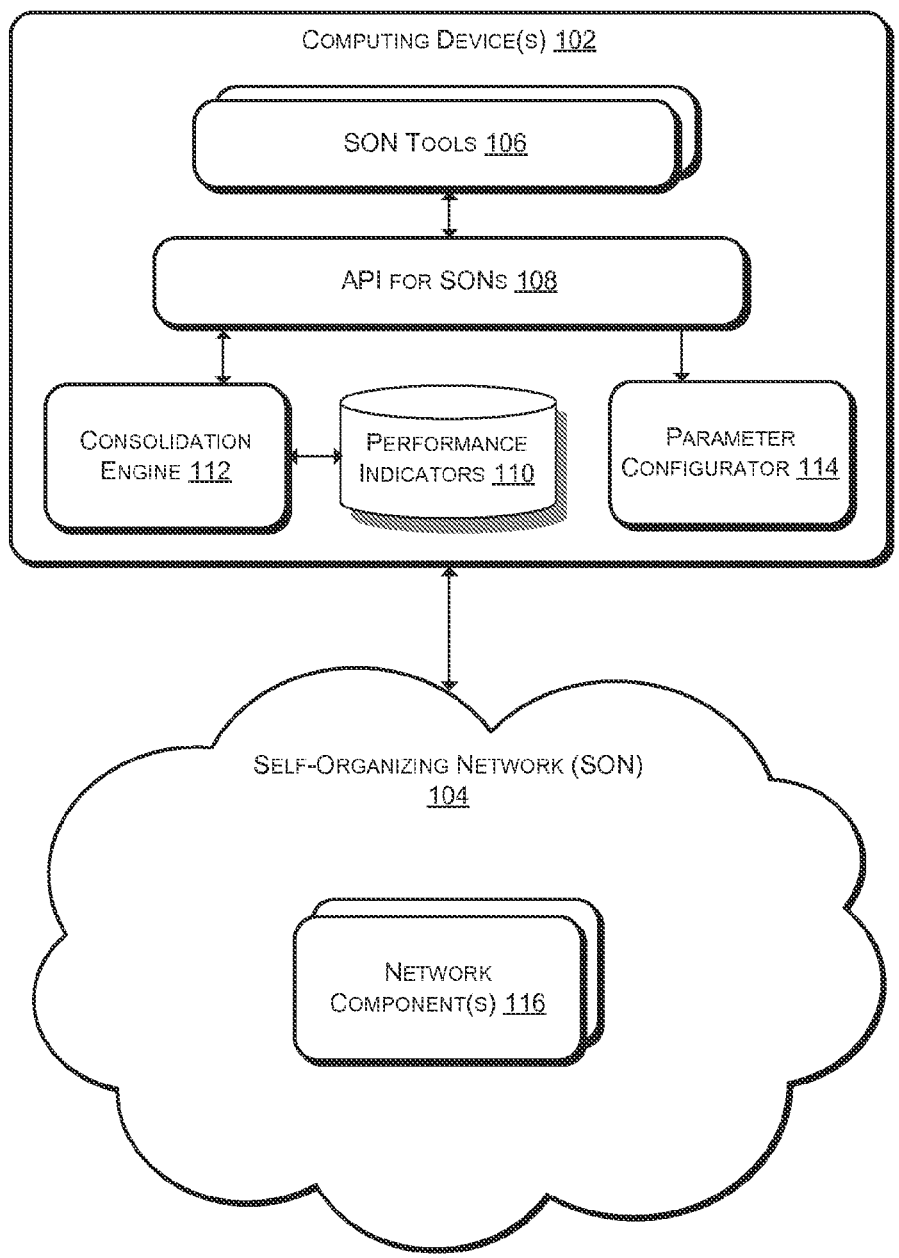
FIG. 1 illustrates an overview of a SON with an application programming interface (API) common to a plurality of SON tools, the SON tools receiving performance indicators via the API and performing at least one action based on the performance indicators.

This disclosure describes, in part, an API for SONs that is common to at least a plurality of SON tools of a specific SON. The API enables multiple SON components to each focus on a purpose (e.g., data consolidation, visualization, etc.) while communicating with each other to accomplish an overall SON plan. Thus, one component may gather network information and determine performance indicators and another may receive updated network configurations and configure network components, and a SON tool may receive performance indicators and provide updated network configurations to those components using the API or perform at least one action based on the performance indicators. The SON tool may also or instead be triggered by another SON component and perform an action, such as restoring a parameter to a specific value following a parameter consistency check, without respect to the performance indictors.

Additionally, the API may be extended by new SON tools, and the SON may include a SON automation engine to receive the new SON tools, to integrate the new SON tools into the SON, and to execute the new SON tools. The SON automation engine may handle a range of tasks for SON tools, significantly reducing the amount of development required for a given SON tool. In some embodiments, the SON automation engine may receive specification of SON tools from developers through, for example, a SON portal.

The disclosure further describes techniques for limiting transmission of messages to a network support node of a system systems network from one or more SON tools. The network support node may, for example, be an operations support system (OSS) node. The techniques include receiving performance information associated with performance of the network support node. The receiving may involve receiving the performance information from a client residing on the network support node or retrieving the performance information by remotely accessing the performance information. Performance information may be associated with performance of hardware or software components of the network support node or with performance of the support systems network including the network support node. For instance, the performance information may be associated with performance of a central processing unit of the network support node, performance of memory of the network support node, input/output performance of the network support node, or performance of storage of the network support node.

In various embodiments, the technique further involve determining that messages from the one or more SON tools are ready to send to the network support node and then limiting the transmission of those messages. Transmission is limited based on the performance information and either or both of priorities associated with the plurality of messages or priorities associated with the SON tool(s). In some embodiments, the limiting includes limiting transmission when the performance information fails to meet a threshold or model. In further embodiments, the limiting includes transmitting a subset of the messages. The subset may include (i) one or more of the messages that each has a priority that meets or exceeds a threshold or (ii) one or more of the messages selected in order of priority until a collective size of the selected messages meets a threshold. In additional embodiments, the limiting may involve limiting the transmission of the messages to subset if the performance information fails to meet a first threshold and preventing the transmission of the messages if the performance information fails to meet a second threshold.

In some embodiments, the techniques for limiting transmission may be implemented by an SON engine configured to execute the one or more SON tools.

Overview

FIG. 1 illustrates an overview of a SON with an application programming interface (API) common to a plurality of SON tools, the SON tools receiving performance indicators via the API and performing at least one action based on the performance indicators. As illustrated, one or more computing devices 102 associated with a SON 104 may be configured with SON tools 106 that utilize an API for SONs 108 which is common to the multiple SON tools 106. The SON tools 106 receive performance indicators 110 associated with network information via the API 108, the performance indicators 110 having been determined by a consolidation engine 112. The SON tools 106 perform at least one action based on the performance indicators 110, such as generating updated network configurations based on the performance indicators 110 and providing the updated network configurations via the API 108 to a parameter configurator 114. The parameter configurator 114 then configures one or more network components 116 of the SON 104 by, for example, updating parameters of the network component(s) 116.

Figure 4:
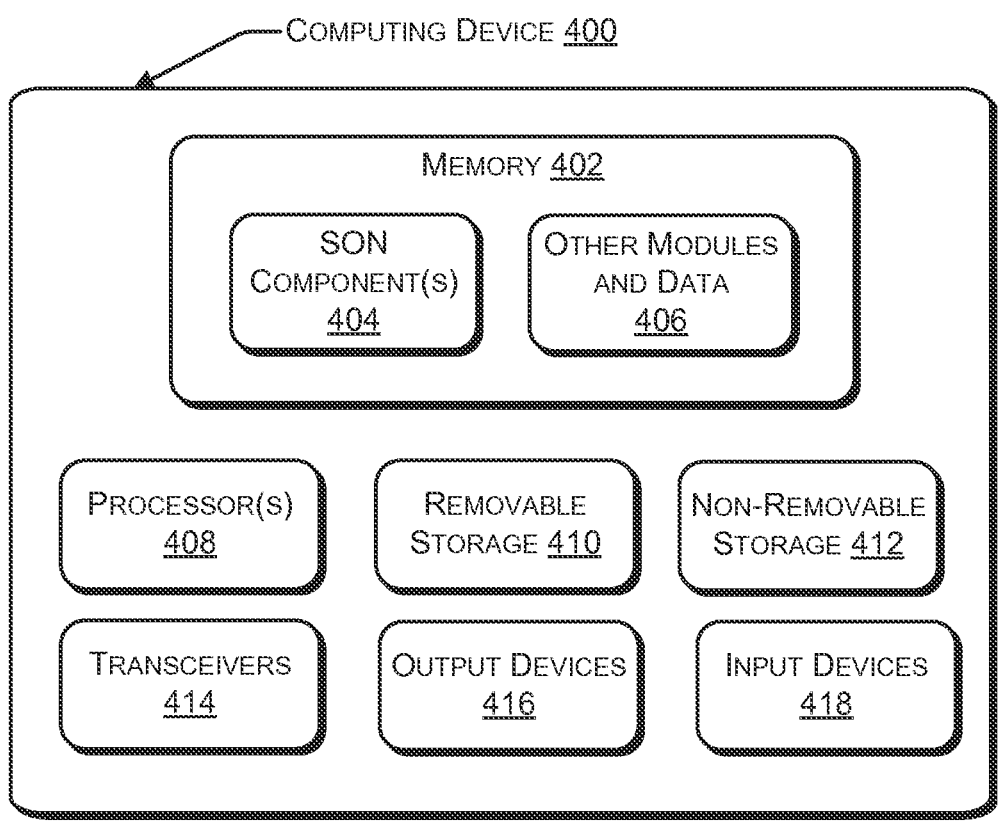
FIG. 4 illustrates a component level view of a computing device configured to implement one or more SON components.

In various embodiments, the computing device(s) 102 may each be or include a server or server farm, multiple, distributed server farms, a mainframe, a work station, a personal computer (PC), a laptop computer, a tablet computer, an embedded system, or any other sort of device or devices. In one implementation, the computing device(s) 102 represent a plurality of computing devices working in communication, such as a cloud computing network of nodes. The computing device(s) 102 may belong to the SON 104 or may be external to but in communication with the SON 104. An example computing device 102 is illustrated in FIG. 4 and is described in detail below with reference to that figure.

The SON 104 may be any sort of network configured by SON components to perform at least one of self-configuring, self-optimizing, or self-healing. Such SON components are illustrated in FIG. 1 by elements 106-114. For example, the SON 104 may be a radio access network, such as a telecommunication network, a smart energy grid network, or a medical health network. The network component(s) 116 of the SON 104 may be subnetworks, devices, or modules capable of being initialized or configured by the SON components 106-114. For example, when the SON 104 is a telecommunication network, such as a 2G, 3G, or 4G/LTE network, the network component(s) 116 may be base stations (e.g., Node Bs or eNode Bs), radio network controllers (RNCs), an operations support system (OSS), a word order system, or other network element(s). Information about the SON 104 (referred to herein as "network information"), such as measurements or parameters, may also be provided by the network component(s) 116, or may instead be provided by other sources within the SON 104. For example, the network information may be provided by any or all of a trouble ticket system, radio traces, core network traces, from an OSS, or from one or more other network elements. Depending on the purpose(s) of the SON 104 (e.g., telecommunications, energy, medical health), the SON 104 may include any number of different subnetworks, devices, and modules specific to the purpose(s) of the SON 104 and may be in communication with any number of devices external to the SON 104.

In some embodiments, the consolidation engine 112 may be a SON component whose purpose to receive or retrieve network information and to determine performance indicators 110 based on that network information. The consolidation engine 112 may have ongoing, periodic, or event-driven connections to sources of network information of the SON 104, and the consolidation engine 112 receives or retrieves the network information via those connections.

Upon receiving the network information, the consolidation engine 112 utilizes a store of performance indicators 110, such as key performance indicators, associated with the API 108 to determine new/updated performance indicators 110. The store of performance indicators 110 may be any sort of database, file, or data structure. Also, the store of performance indicators 110 may be associated with a schema, and the schema may be extended, along with the API 108, in response to the addition of new SON tools 106. Based on the schema, the stored performance indicators 110, and the received or retrieved network information, the consolidation engine 112 determines new/updated performance indicators 110 and stores those new/updated performance indicators 110 in the store of performance indicators 110. New performance indicators 110 may be generated by the consolidation engine 112 responsive to a request to generate a performance indicator 110 that was received by the consolidation engine 112 from a SON tool 106. In some embodiments, this may involve filtering out redundant or non-utilized network information.

The consolidation engine 112 may then automatically provide the determined performance indicators 110 to one or more of the SON tools 106 by utilizing the API 108 to invoke the one or more SON tools 106. The SON tools 106 invoked may be a function of which performance indicators 110 have been added or updated. In other embodiments, rather than automatically invoking SON tools 106, the consolidation engine 112 may be queried for performance indicators 110 by the SON tools 106 via the API 108.

In various embodiments, the API 108 is an API for SONs that may be standardized and shared among multiple SONs. When standardized, the API 108 may expose at least one of standardized methods/procedures or standardized parameters, such as performance indicators 110. In other embodiments, the architecture utilizing the API 108 may be standardized among multiple SONs, but the API 108 may be specific to the SON 104, including methods/procedures and parameters/performance indicators 110 that are specific to the SON tools 106. For example, an SON tool 106 may have a method to invoke that SON tool 106 to generate an updated network configuration, and the method may be associated with specific performance indicators 110 that are to be provided when calling the method. Such a method may be part of the API 108. Likewise, the consolidation engine 112 may provide a query method for retrieving performance indicators 110, the query method having as parameters the identifiers of the performance indicators 110 being sought by the query. Such a query method may also be part of the API 108. In addition, the API 108 may include methods for providing data to or for receiving or retrieving data from any of the SON components 106-114. In some embodiments, the API 108 may include methods for alerts or alarms that may be utilized by the SON tools 106 to receive notifications that, for example, a performance indicator 110 exceeds a threshold. Also, while the API 108 is illustrated as a separate SON component, it is to be understood that the methods/processes associated with the API 108 are methods/processes of the other SON components 106 and 110-114 and that API 108 may simply be a logical representation, not a separate module of code or hardware device.

In some embodiments, the SON tools 106 may each be responsible for performing some task associated with self-configuration, self-optimization, or self-healing of the SON 104 resulting, for example, in the generation of an updated network configuration by that SON tool 106. The SON tools 106 may also each invoke, via the API 108, a SON component to perform an action based on the performance indicators 110, invoke, via the API 108, an engineering tool based on the performance indicators 110, pass, via the API 108, information associated with the performance indicators 110 to a SON component, sending, via the API 108, a notification associated with the performance indicators 110, or generate of a report based on the performance indicators 110.

The updated network configuration may simply be an update to a single parameter of a single network component 116 or may represent a more comprehensive configuration of multiple parameters of multiple network components 116. A SON tool 106 may be invoked by the consolidation engine 112 and receive performance indicators 110 or may invoke a query method of the API 108 associated with the consolidation engine 112 to receive or retrieve performance indicators 110. A SON tool 106 may also be invoked by another SON tool 106 through the API 108, and those SON tools 106 may collaborate.

Using the performance indicators 110, the SON tool 106 may generate an updated network configuration and invoke a method of the API 108 associated with the parameter configurator 114 to provide the parameter configurator with the updated network configuration. For example, the SON tool 106 may be a rehoming tool and may receive a performance indicator 110 which notifies the SON tool 106 that an RNC has been added for a geographic area. In response, the SON tool 106 may generate an updated network configuration which reassigns a number of base stations that are currently associated with one RNC to the new RNC.

Examples of SON tools 106 may include any or all of an automated report generating tool, a parameter consistency check tool, a real-time alert tool, a mobility evaluation tool, a coverage and interference management tool, a network outage tool, a network configuration tool, a load distribution tool, a spectrum carving tool, or a special events tool. Additionally or instead, the SON tools 106 may include any or all of a performance management tool, a radio frequency (RF) planning tool, an automatic frequency planning tool, a rehoming tool, an automatic cell planning tool, or a geolocation tool.

In some embodiments, SON tools 106 may perform actions without respect to performance indicators 110. The SON tools 106 may be triggered by other SON components and may perform an action, such as resetting a parameter, without needing to receive or retrieve performance indicators 110.

In various embodiments, the parameter configurator 114 may be invoked by a SON tool 106 and provided, via the API 108, with an updated network configuration. Alternatively, the parameter configurator 114 may invoke a SON tool 106 to retrieve an already prepared, updated network configuration or to have the SON tool 106 generate and provide an updated network configuration. Upon retrieving or receiving the updated network configuration, the parameter configurator 114 configures one or more network components 116 with the updated network configuration. As mentioned above, this may involve adjusting one or more parameters or network component(s) 116. Example network component(s) 116 are described above in further detail.

Example Environment

Figure 2:
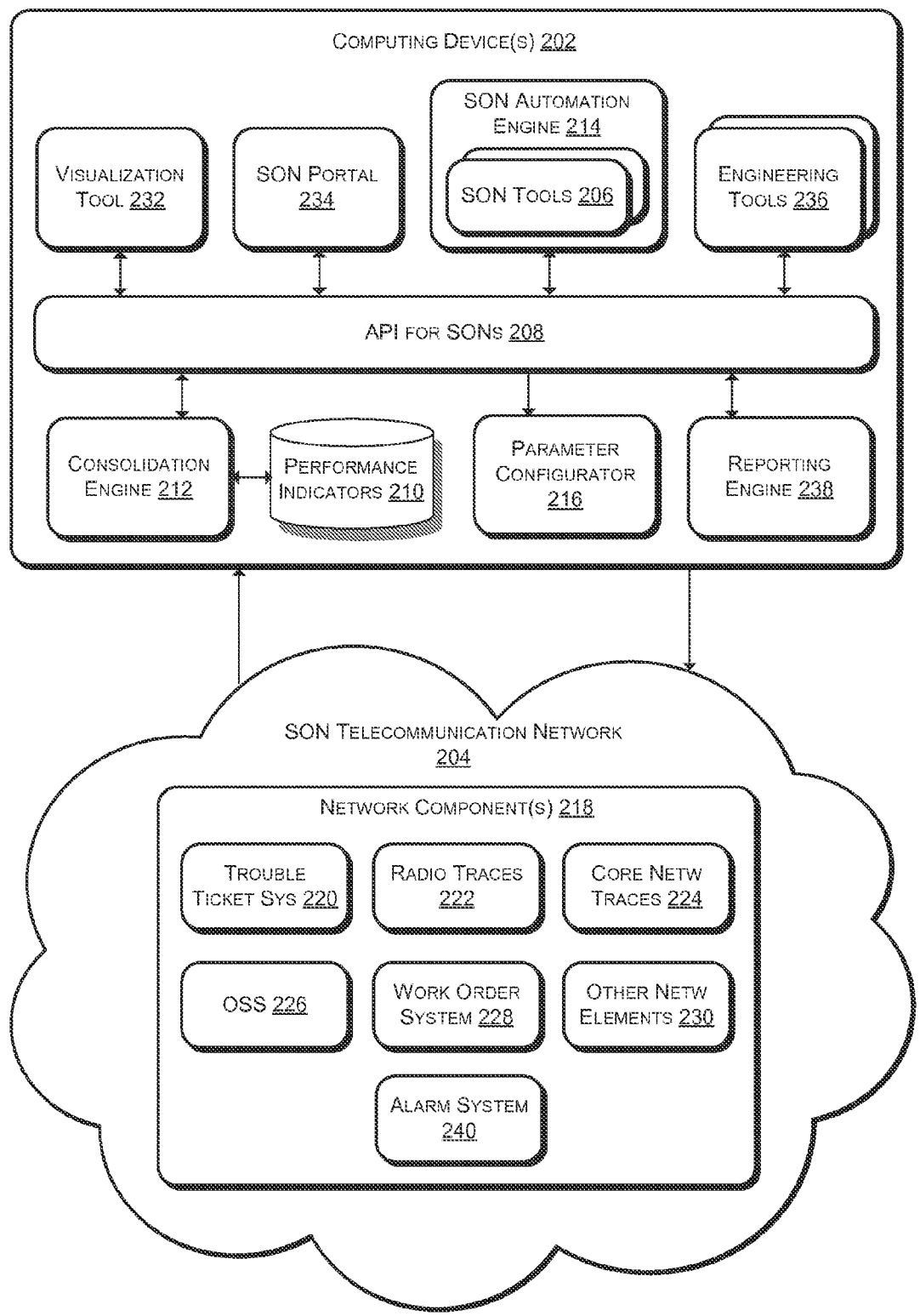
FIG. 2 illustrates an example environment including multiple SON components for a telecommunication network, the multiple SON components sharing a common API and each performing some aspect of planning, configuring, managing, optimizing, or healing the telecommunication network in an automated fashion. The API enables further SON components to be added or modified.

FIG. 2 illustrates an example environment including multiple SON components for a telecommunication network, the multiple SON components sharing a common API and each performing some aspect of planning, configuring, managing, optimizing, or healing the telecommunication network in an automated fashion. The API enables further SON components to be added or modified. As illustrated, one or more computing devices 202 associated with a SON telecommunication network 204 may be configured with SON tools 206 that utilize an API for SONs 208 which is common to the multiple SON tools 206. The SON tools 206 receive performance indicators 210 associated with network information via the API 208, the performance indicators 210 having been determined by a consolidation engine 212. A SON automation engine 214 executes the SON tools 106, causing the SON tools 106 to perform an action based on the performance indicators 210, such as generating updated network configurations based on the performance indicators 210 and provide the updated network configurations via the API 208 to a parameter configurator 216. The parameter configurator 216 then configures one or more network components 216 of the SON telecommunication network 204 by, for example, updating parameters of the network component(s) 218. Example network component(s) 218 may include a trouble ticket system 220, radio traces 222, core network traces 224, an OSS 226, a work order system 228, one or more other network elements 230, or an alarm system 240.

In addition, the SON components illustrated in FIG. 2 include a visualization tool 232 to generate visualizations based on the performance indicators 210, a SON portal 234 to display the visualizations, to enable user collaboration regarding the SON telecommunication network 204, and to enable developer specification of SON tools 206, engineering tools 236, and a reporting engine 238. The engineering tools 236 may be invoked by SON tools 206 to participate in self-configuring, self-optimizing, or self-healing the SON telecommunication network 204. The visualization tool 232, SON portal 234, and engineering tools 236 may communicate with each other and with other SON components via the API 208.

The computing device(s) 202 may be similar to or the same as computing device(s) 102. Likewise, SON telecommunication network 204 may be similar to or the same as SON 104, with the difference that SON telecommunication network 204 is specifically identified as a telecommunication network. Network component(s) 218 may also be similar to or the same as network component(s) 116, except that specific network component(s) 220-230 are illustrated and identified in FIG. 2. Those network component(s) 218—a trouble ticket system 220, radio traces 222, core network traces 224, an OSS 226, a work order system 228, one or more other network elements 230, and alarm system 240—are also mentioned above with respect to network component(s) 116 as examples of network component(s) 116 that may be associated with SON 104 when SON 104 is a telecommunication network. These network component(s) 218 and other sources of network information may provide network information to the consolidation engine 212 and receive updated network configurations from the parameter configurator 216.

In some embodiments, the SON tools 206, API 208, performance indicators 210, consolidation engine 212, and parameter configurator 216 may be similar to or the same as SON tools 106, API 108, performance indicators 110, consolidation engine 112, and parameter configurator 114, and what is written above with respect to these SON components 106-114 may also apply to SON components 206-212 and 216, except as distinguished in describing FIG. 2.

In various embodiments, the visualization tool 232 may be invoked by or may query the consolidation engine 212 via the API 208, and the visualization tool 232 may receive performance indicators 210 as a result of the invoking or querying. The visualization tool 232 may receive the performance indicators 210 periodically or on an event-driven basis as a result, for example, of performance indicators meeting a threshold or model specified by a rule of the visualization tool 232 or the consolidation engine. For instance, the visualization tool 232 may have a rule specifying that the visualization tool 232 is to receive notification if a performance indicator 210 exceeds a certain threshold, and the consolidation engine 212 may expose, via the API 208, an alert or alarm method that the visualization tool 232 may register for. In such an instance, responsive to registration by the visualization tool 232, the visualization tool 232 may be invoked to receive an alert or alarm when the performance indicator 210 exceeds the threshold.

In some embodiments, the visualization tool 232 generates visualizations based on the performance indicators 210, alerts, or alarms. These visualizations may graphically convey information about the SON telecommunication network 204 and may be displayed to a user. In order to provide the visualizations to users, the visualization tool 232 may provide the visualizations to the SON portal 234, which may display the visualizations, or may provide them to another device for display, such as a server or an end user device. The SON portal 234 or device that the visualization is shared with may be a function of configuration of the visualization tool 232.

Also, in further embodiments, the visualization tool 232 may invoke the SON automation engine 214 or a particular SON tool 206 executed by that SON automation engine 214 based on rules or user input. Such rules may direct the visualization tool 232 to invoke the SON automation engine 214 or SON tool 206 when a performance indicator 210 meets a threshold or model or when an alert or alarm is received. User input, received in response to providing a visualization, may also cause the visualization tool 232 to invoke the SON automation engine 214 or SON tool 206.

In various embodiments, the SON portal 234 may be a user-facing component for displaying information, enabling collaboration of users, and enabling specification by users of SON tools 206. The SON portal 234 may receive, via the API, visualizations from the visualization tool 232 and may provide those visualization to a user device through, for example, web page. The SON portal 234 may also receive other network information or performance indicators 210 via the API 208 from any of the SON components, such as the consolidation engine 212 or the visualization engine 232. The SON portal 234 may also receive user input in return and may provide that user input to a SON tool 206 or to the visualization engine 232 to utilize in performing an action or in further visualizations.

The SON portal 234 may also include a collaboration engine or other social network component which enables users to communicate about the SON telecommunication network 204, including discussing problems with the SON plan implemented by the SON telecommunication network 204 and suggestions for improving that plan. In some embodiments, the SON portal 234 may even enable users to vote on a number of suggested improvements to the SON plan, and the improvement with the highest plurality of votes may be implemented by developers associated with the SON telecommunication network 204 specifying a new SON tool 206.

In further embodiments, the SON portal 234 enables specification of SON tools 206. The SON portal 234 may offer a user interface for textual or graphical specification of a new SON tool 206. Such a user interface may simply accept textually-specified code for a SON tool 206, or may even allow a user to select graphical representations of SON components (e.g., a graphical representation of the consolidation engine 212) to cause automatic specification of code for accessing the SON component through the API 208. Also, the SON portal 234 may automatically specify or update SON tools 206 based on user comments. For example, a SON tool 206 may have a threshold at which user devices are reassigned to different access networks to avoid congestion. If there are sufficient complaints of congestion, the SON portal 234 may update that threshold to better avoid congestion.

In various embodiments, the SON automation engine 214 may execute any one or more of the SON tools 206 in response to being invoked through the API 208 or in response to the SON tool 206 being invoked, receiving an alarm or alert, etc. The SON automation engine 214 may handle a number of execution-related functions for SON tools 206, such as memory allocation and release, calls to system components, etc. Also, the SON automation engine 214 may receive specifications of SON tools 206 from the SON portal 234, compile those specifications if compiling is needed, and execute those SON tools 206.

The SON automation engine 214 may also provide an API 208 for SON tools 206 such that SON tools 206 utilize the API 208 of the SON automation engine 214 rather than extending the API 208 with their own method/procedures. In such an embodiment, the API 208 may be relatively stable, with each of the consolidation engine 212, visualization tool 232, SON portal 234, engineering tools 236, reporting engine 238, parameter configurator 214, and SON automation engine 214 having their own method/procedure and performance indicators/parameters. Such a relatively stable API 208 may significantly reduce the burden on developers.

In further embodiments, the engineering tools 236 may participate with SON tools 206 in self-configuring, self-optimizing, or self-healing the SON telecommunication network 204. The engineering tools 236 may even be SON tools themselves, operating independently and without need of execution by the SON automation engine 214. As with other SON components, the engineering tools 236 may receive or retrieve data through, and provide output to, the API 208. Example engineering tools 236 may include at least one of a performance management tool, a RF planning tool, an automatic frequency planning tool, a rehoming tool, an automatic cell planning tool, or a geolocation tool. Each engineering tool 236 may provide output used by other engineering tools 236 or by SON tools 206.

The reporting engine 238 may participate with the SON tools 206 in generating reports. The reporting engine 238 may even be a SON tool itself, operating independently and without need of execution by the SON automation engine 214. As with other SON components, the reporting engine 238 may receive or retrieve data through, and provide output to, the API 208.

In some embodiments, while the SON automation engine 214, visualization tool 232, SON portal 234, engineering tools 236, and reporting engine are illustrated in FIG. 2 in connection with a SON telecommunication network 204, the SON automation engine 214, visualization tool 232, SON portal 234, engineering tools 236, and reporting engine 238 may also be associated with other types of SONs.

Example Environment Including Network Support Node and SON Tool(s)

Figure 3:
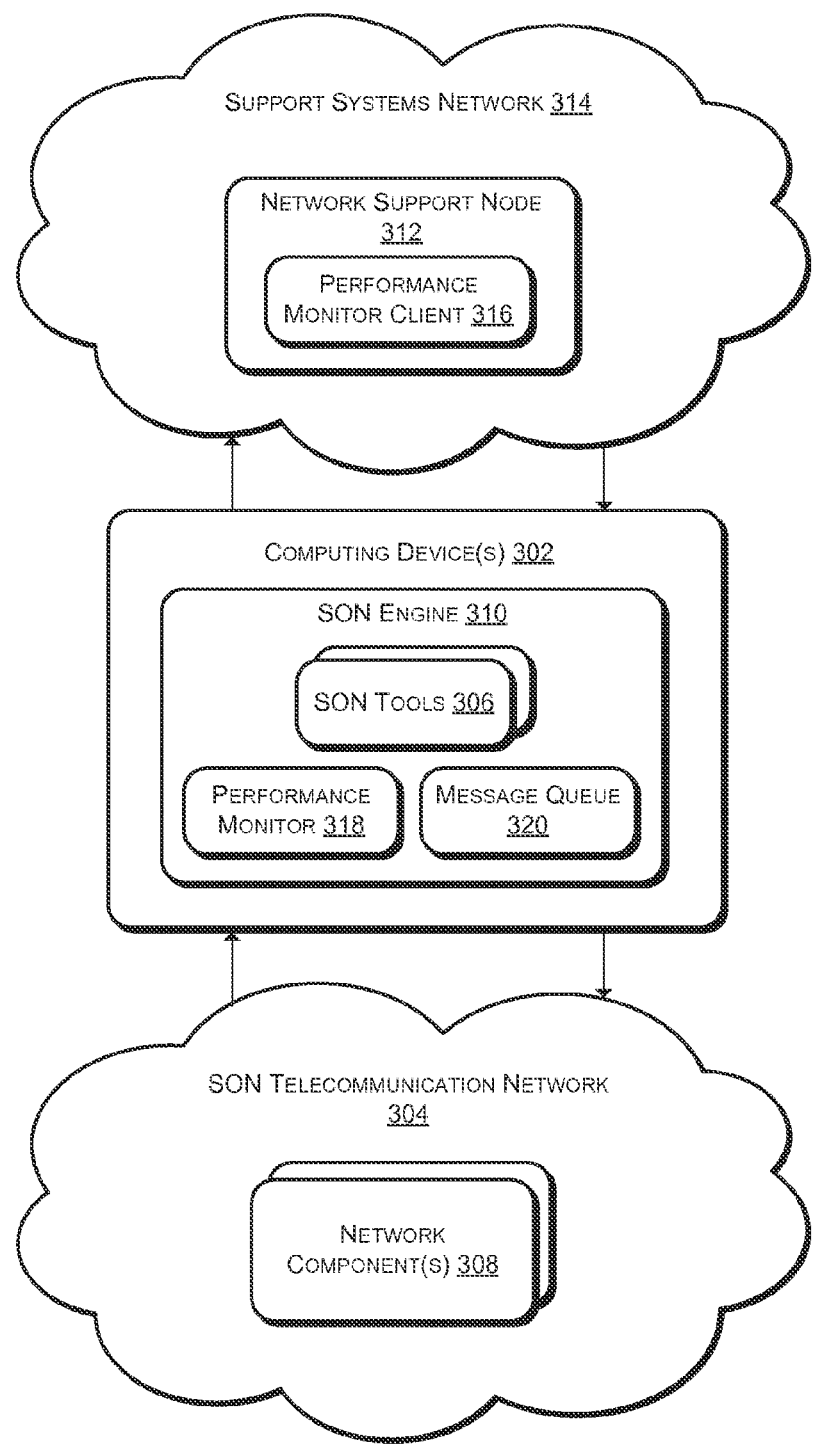
FIG. 3 illustrates a further example environment including a SON telecommunication network, a support systems network including a network support node, and SON tools associated with messages for transmission to the network support node.

FIG. 3 illustrates a further example environment including a SON telecommunication network, a support systems network including a network support node, and SON tools associated with messages for transmission to the network support node. As illustrated, one or more computing devices 302 associated with a SON telecommunication network 304 may be configured with SON tools 306 to enable configuring of one or more network components 308 of the SON telecommunications network 304 by, for example, updating parameters of the network component(s) 308. The SON tools 306 may be executed by a SON engine 310. The SON engine 310 may receive performance information associated with performance of a network support node 312 of a support systems network 314. The performance information may be obtained from a performance monitor client 316 of the network support node 312 or using a performance monitor 318 of the SON engine 310. The SON engine 310 may also include a message queue 320 to queue messages for transmission from the SON tools 306 to the network support node 312 may limit transmission of messages from the message queue 320 based on the performance information and on priorities associated with the messages or with the SON tools 306.

In various embodiments, the computing device(s) 302 may be examples of computing device(s) 102 or computing device(s) 202. Likewise, SON telecommunication network 304 may be an example of SON 104 or SON telecommunications network 204, and network component(s) 308 may be examples of network component(s) 116 or network component(s) 218. Further, SON tools 306 may be examples of SON tools 106 or SON tools 206, and the SON engine 310 may be an example of the SON automation engine 214. These components are described in greater detail herein.

The network support node 312 may be any sort of node of a support services network 314. Such a network support node 312 may engage in significant communication with SON tools 306, performing numerous read and write operations which consume significant resources of the network support node 312, such as CPU, memory, I/O, and storage resources of the network support node 312. The network support node 312 may, for instance, request that SON tools 306 update a configuration of the SON telecommunication network 304 or may request a report from the SON tools 306 on performance of the network components(s) 308 of the SON telecommunication network 304. As mentioned above, in some embodiments, the network support node 312 may be an OSS node 312 operated by supported systems personnel or software. Further, the network support node 312 may be or include a server or server farm, multiple, distributed server farms, a mainframe, a work station, a PC, a laptop computer, a tablet computer, an embedded system, or any other sort of device or devices.

In various embodiments, the support system network 314 may be an internal network of the telecommunication network provider for the SON telecommunication network 304. The support systems network 314 may thus be an internal, private network, although in some embodiments, the support systems network 314 may include public network(s). The support systems network 314 may include one or more nodes, including the network support node 312, engaged in support, repair, maintenance, and monitoring of the SON telecommunication network 304 and its network component(s) 308. For example, the network support node 312 may be an OSS node and may monitor and remotely configure a network component 308 such as a base station. In some instances, as described herein, the monitoring and configuration may be achieved through SON tools 306, which may communicate with the network support node 312.

In some embodiments, the network support node 312 may be equipped with a performance monitor client 316 to monitor performance of hardware or software components of the network support node 312, such as the CPU, memory, I/O, or storage. The performance monitor client 316 may also or instead monitor performance of the support systems network 314. Periodically, or in response to events or changes in performance, the performance monitor client 316 may report performance information associated with the monitored performance to the computing device(s) 302.

Additionally or instead, the computing device(s) 302 may include a performance monitor 318 to monitor performance of hardware or software components of the network support node 312, such as the CPU, memory, I/O, or storage. The performance monitor 318 may also or instead monitor performance of the support systems network 314. The performance monitor 318 may remotely access the performance information, retrieving it or receiving it from the performance monitor client 316 or from another component of the network support node 312. The performance monitor 318 may retrieve or receive the performance information periodically or in response to events or changes in performance. While the performance monitor 318 is illustrated as a component of the SON engine 310, it may instead be a component of one or more SON tools 306 or may be a component of the computing device(s) 302 that is separate from but in communication with the SON engine 310 or SON tools 306.

In various embodiments, messages from SON tools 306 which are ready for transmission to the network support node 312 are queued in the message queue 320. When the SON tools 306 are executed by a SON engine 310, the message queue 320 may be a component of that SON engine 310. For SON tools 306 which are executed on their own, message queue 320 may be a component of those SON tools 306 or used by those SON tools 306. Each message stored in the message queue 320 may be associated with one or more priorities. For example, a message may be associated with a priority based on which SON tool 306 the message is from. A message may also be associated with a priority based on which network parameter or network parameters the message is associated with.

When the message queue 320 includes message to transmit, the SON engine 310 or a SON tool 306 may determine whether to proceed with transmission based on the performance information. For example, the SON engine 310 or a SON tool 306 may determine whether the performance information meets one or more thresholds or models. If the performance information fails to meet a first threshold, the transmission of the messages may be limited to a subset of the messages in the message queue 320. If the performance information fails to meet a second threshold, the SON engine 310 or a SON tool 306 may halt/prevent transmission of the messages. These thresholds or models may be indicative of different levels of congestion on the network support node 312 or in the support systems network 314.

When the SON engine 310 or a SON tool 306 determines, based on the performance information, that the transmission of messages should be limited to a subset of the messages in the message queue 320, the SON engine 310 or a SON tool 306 utilizes the priorities of the messages to select the messages included in the subset. For example, the SON engine 310 or a SON tool 306 may select all messages with a specific priority or with a priority that meets or exceeds a threshold to include in the subset. Alternatively, the SON engine 310 or a SON tool 306 may select one or more messages in order of priority until a collective size or number of the selected messages meets a threshold. When a message is associated with multiple different priorities, the highest priority may be used by the SON engine 310 or a SON tool 306, or some other scheme for selecting among the different priorities may be used by the SON engine 310 or a SON tool 306. The SON engine 310 or a SON tool 306 may then transmit the selected subset to the network support node 312.

Example Device

FIG. 4 illustrates a component level view of a computing device configured to implement one or more SON components. As illustrated, the computing device 400 comprises a system memory 402 storing one or more SON components 404 and other modules and data 406. Also, the computing device 400 includes processor(s) 408, a removable storage 410, a non-removable storage 412, transceivers 414, output device(s) 416, and input device(s) 418.

In various embodiments, system memory 402 is volatile (such as RAM), non-volatile (such as ROM, flash memory, etc.) or some combination of the two. The SON component(s) 404 may be any one or more of the SON tools 106, the API 108, the performance indicator store 110, the consolidation engine 112, or the parameter configurator 114 described above in detail with regard to FIG. 1. The SON component(s) 404 may also or instead be any one or more of the SON tools 206, the API 208, the performance indicator store 210, the consolidation engine 212, the SON automation engine 214, the parameter configurator 216, the visualization tool 232, the SON portal 234, or the engineering tools 236 described above in detail with regard to FIG. 2. Further, the SON component(s) may also or instead be the SON tools 306, SON engine 310, performance monitor 318, or message queue 310 described above in detail with regard to FIG. 3. The other modules or data 406 stored in the system memory 402 may comprise any sort of applications or platform components of the computing device 400, as well as data associated with such applications or platform components.

In some embodiments, the processor(s) 408 is a central processing unit (CPU), a graphics processing unit (GPU), or both CPU and GPU, or any other sort of processing unit.

The computing device 400 also includes additional data storage devices (removable and/or non-removable) such as, for example, magnetic disks, optical disks, or tape. Such additional storage is illustrated in FIG. 4 by removable storage 410 and non-removable storage 412. Tangible computer-readable media may include volatile and nonvolatile, removable and non-removable media implemented in any method or technology for storage of information, such as computer readable instructions, data structures, program modules, or other data. System memory 402, removable storage 410 and non-removable storage 412 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by the computing device 400. Any such tangible computer-readable media may be part of the computing device 400.

In some embodiments, the transceivers 414 include any sort of transceivers known in the art. For example, transceivers 414 may include a radio transceiver that performs the function of transmitting and receiving radio frequency communications via an antenna. The transceivers 414 may facilitate wireless connectivity between the computing device 400 and various nodes of the SON 104, SON telecommunication network 204, or SON telecommunication network 304. In addition, the transceivers 414 may also include a wireless communication transceiver and a near field antenna for communicating over unlicensed wireless IP networks, such as local wireless data networks and personal area networks (e.g., Bluetooth or near field communication (NFC) networks). Further, the transceivers 414 may include wired communication components, such as an Ethernet port, that connect the computing device 400 in a wired fashion to one or more nodes of the SON 104, SON telecommunication network 204, or SON telecommunication network 304.

In some embodiments, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various embodiments, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
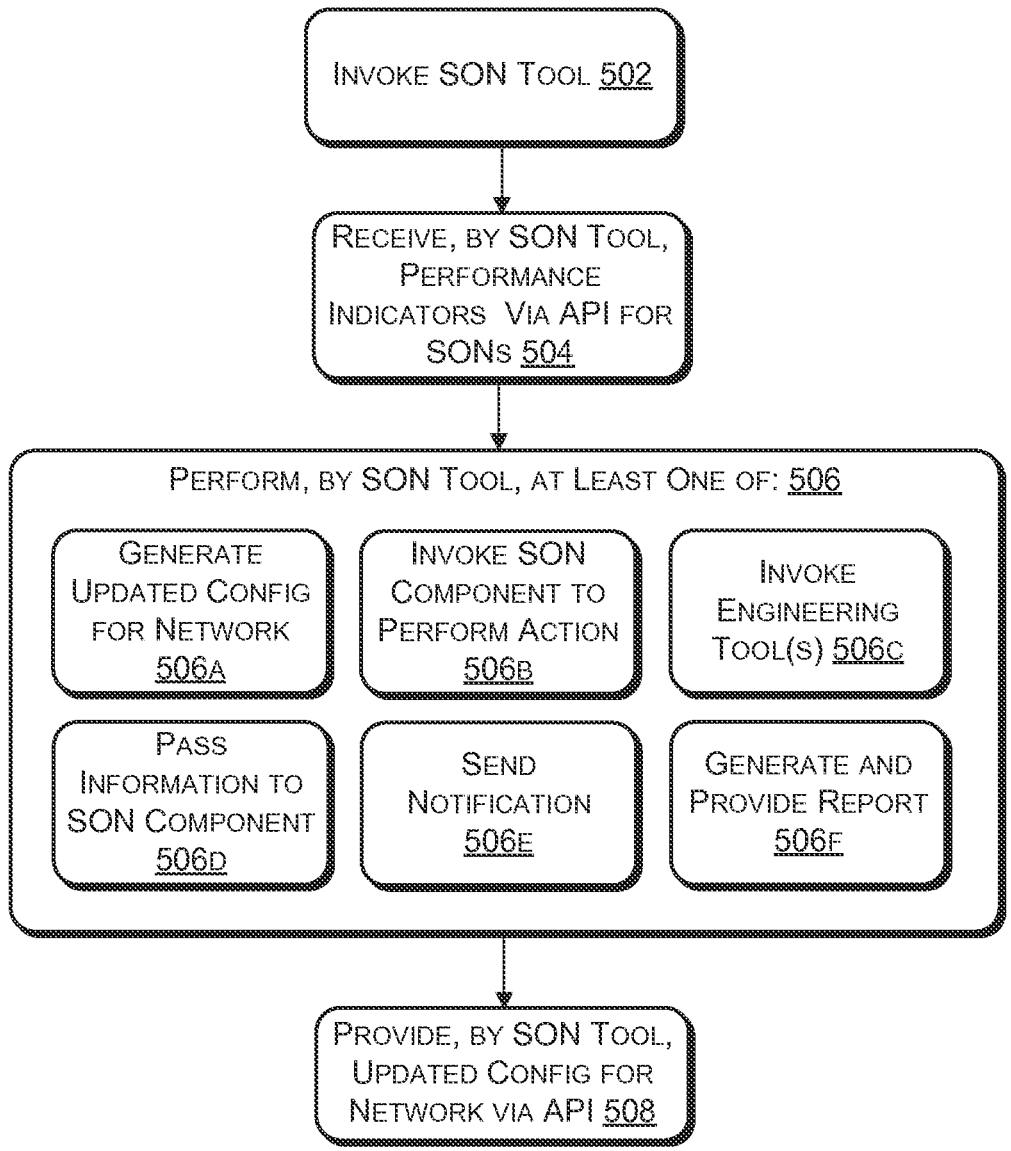
FIG. 5 illustrates an example process for receiving through an API for SONs, by a SON tool, performance indicators and performing at least one action based on the performance indicators.
Figure 6:
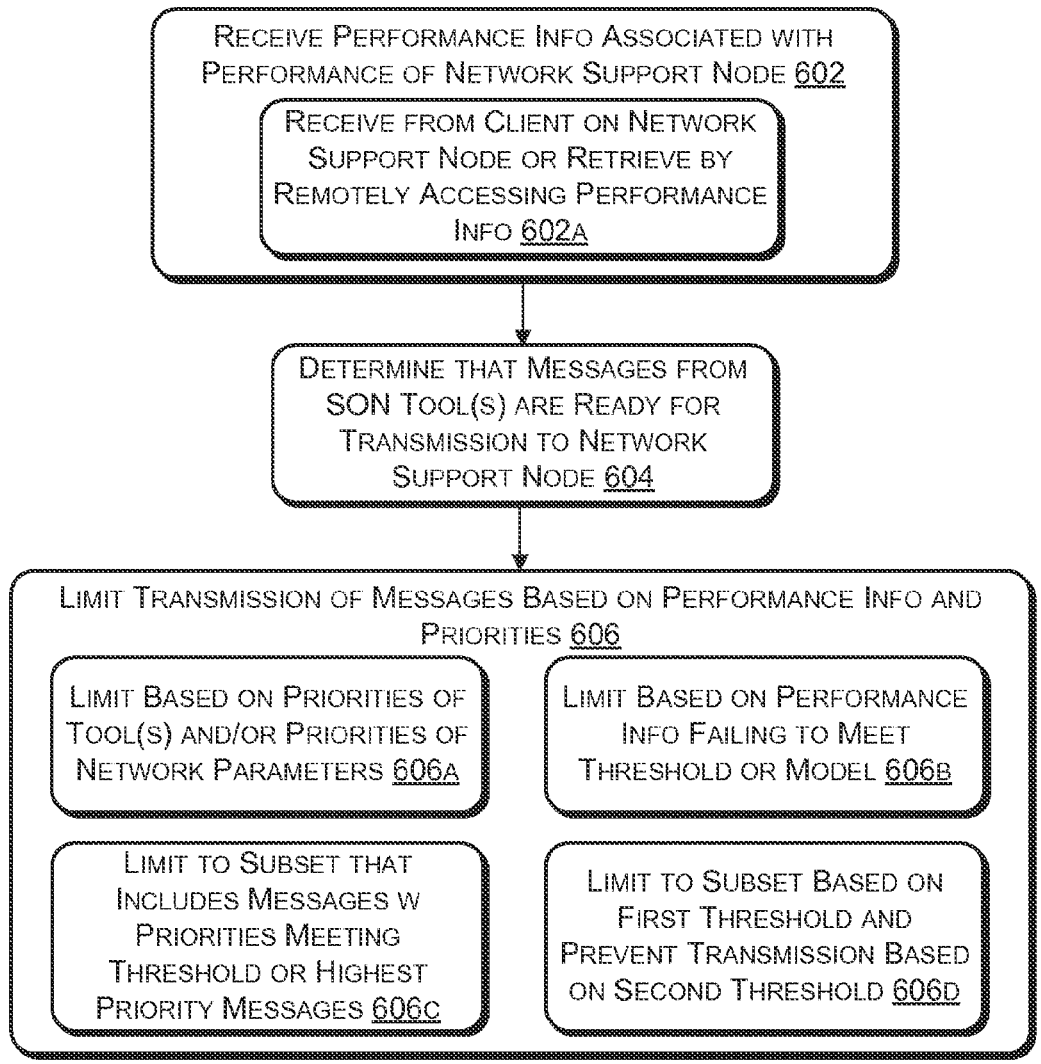
FIG. 6 illustrates an example process for receiving performance information associated with performance of a network support node, determining that there are messages from SON tools for transmission to the network support node, and limiting transmission of the messages based on the performance information and on priorities associated with SON tools or network parameters.

FIGS. 5 and 6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for receiving through an API for SONs, by a SON tool, performance indicators and performing at least one action based on the performance indicators. The process includes, at 502, the invoking of a SON tool by one or more of a visualization tool, another SON tool, a consolidation engine, or a SON portal. In other embodiments, rather than being invoked, the SON tool may be executed continuously or periodically.

At 504, the SON tool receives one more performance indicators associated with network information, the performance indicators received via an API for SONs that is utilized by a plurality of SON tools. The network information and the one or more network components are associated with one of a telecommunication network, a smart power grid, or a medical health system. In some embodiments, the API offers one or more alerts and alarms that may be received by or invoked by the SON tool.

At 506, the SON tool performs at least one action based at least in part on the one or more performance indicators, the at least one action being one of, at 506*a*, generating an updated network configuration, at 506*b*, invoking, via the API, a SON component to perform an action, at 506*c*, invoking, via the API, an engineering tool to perform an action, at 506*d*, passing, via the API, information to a SON component, at 506*e*, sending, via the API, a notification, or at 506*f*, generating a report.

At 508, the SON tool provides the updated network configuration via the API to configure one or more network components. In some embodiments, the updated network configuration comprises an update to at least one of the one or more performance indicators.

FIG. 6 illustrates an example process for receiving performance information associated with performance of a network support node, determining that there are messages from SON tools for transmission to the network support node, and limiting transmission of the messages based on the performance information and on priorities associated with SON tools or network parameters. The example process includes, at 602, receiving, by a computing device implementing one or more SON tools, performance information associated with performance of a network support node. The network support node may be an OSS node. At 602*a*, the performance information may be received from a client component residing on the network support node or is retrieved by a component on a SON engine or SON tool which remotely accesses the performance information. Performance information may be associated with performance of hardware or software components of the network support node or with performance of a support systems network including the network support node. For example, the performance information may be associated with performance of a central processing unit of the network support node, performance of memory of the network support node, input/output performance of the network support node, or performance of storage of the network support node.

At 604, the computing device determines that a plurality of messages from one or more SON tools are ready for transmission to the network support node. At least two messages of the plurality of messages may be associated with (i) different ones of the SON tools having different priorities or (ii) different ones of a plurality of network parameters having different priorities.

At 606, the computing device limits transmission of the plurality of messages based at least in part on the performance information and on (i) priorities of the SON tools or (ii) priorities of parameters. At 606*a*, the limiting may include limiting transmission based on both the priorities of the SON tools and on priorities of the parameters. At 606*b*, the limiting includes limiting the transmission of the plurality of messages when the performance information fails to meet one or more thresholds or models. At 606*c*, the limiting includes transmitting a subset of the plurality of messages. The subset may include (i) one or more messages of the plurality of messages that each have a priority that meets or exceeds a threshold or (ii) one or more messages selected in order of priority until a collective size of the selected messages meets a threshold. At 606*d*, the limiting involves limiting the transmission of the plurality of messages to subset of the plurality of messages if the performance information fails to meet a first threshold and preventing the transmission of the plurality of messages if the performance information fails to meet a second threshold.

In some embodiments, the SON tools are implemented by a SON engine of the computing device, the SON engine performing the receiving, the determining, and the limiting at 602-606.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
a processor;
a communication component in communication with an operations support system (OSS) node of an OSS network that is configured to support a self-organizing network (SON) telecommunication network; and
memory storing a message queue and a SON engine that, when operated by the processor, executes a plurality of SON tools,
wherein the SON engine is configured to perform operations comprising:
receiving OSS performance information from the OSS node indicative of performance of hardware or software component(s) of the OSS node;
placing a plurality of messages that are to be sent to the OSS node from the plurality of SON tools in the message queue;
determining that at least two messages in the message queue have different priorities based on priorities of the SON tools that originated the at least two messages or based on priorities of parameters associated with the at least two messages; and
limiting transmission of the plurality of messages in the message queue to the OSS node based at least in part on the OSS performance information and on the different priorities of the at least two messages.

2. The computing device of claim 1, wherein the SON engine is further configured to limit the transmission of the plurality of messages when the OSS performance information fails to meet one or more thresholds or models.

3. The computing device of claim 1, wherein the SON engine is further configured to limit the transmission of the plurality of messages in the message queue by transmitting a subset of the plurality of messages to the OSS node, the subset including (i) one or more messages of the plurality of messages that each have a priority that meets or exceeds a priority threshold or (ii) one or more messages selected in order of priority until a collective size of the selected messages meets a size threshold.

4. A computer-implemented method comprising:
receiving, by a self-organizing network (SON) engine running on a computing device, network support node performance information indicative of performance of hardware or software component(s) of a network support node, the network support node being part of a support systems network that is configured to support a SON telecommunication network;
placing, by the SON engine, a plurality of messages that are to be sent to the network support node from a plurality of SON tools executed by the SON engine in a message queue;
determining, by the SON engine, that at least two messages in the message queue have different priorities based on priorities of the SON tools that originated that at least two messages; and
limiting, by the SON engine, transmission of the plurality of messages in the message queue to the network support node based at least in part on the network support node performance information and on the different priorities of the at least two messages.

5. The method of claim 4, wherein the network support node performance information is indicative of performance of a central processing unit of the network support node, performance of memory of the network support node, input/output performance of the network support node, or performance of storage of the network support node.

6. The method of claim 4, wherein the network support node performance information is received from a client component residing on the network support node or is retrieved by a component on the SON engine which remotely accesses the network support node performance information from the network support node.

7. The method of claim 4, wherein the network support node is an operations support system (OSS) node.

8. The method of claim 4, wherein the limiting further comprises limiting the transmission of the plurality of messages to the network support node when the network support node performance information fails to meet one or more thresholds or models.

9. The method of claim 4, wherein the limiting further comprises transmitting a subset of the plurality of messages to the network support node, the subset including (i) one or more messages of the plurality of messages that each have a priority that meets or exceeds a priority threshold or (ii) one or more messages selected in order of priority until a collective size of the selected messages meets a size threshold.

10. The method of claim 4, wherein the different priorities of the at least two messages is further based on priorities of network parameters associated with the at least two messages.

11. The method of claim 4, wherein the limiting comprises transmitting a subset of the plurality of messages to the network support node if the network support node performance information fails to meet a first threshold or preventing the transmission of the plurality of messages to the network support node if the network support node performance information fails to meet a second threshold.

12. One or more non-transitory computer-readable media having stored thereon a plurality of programming instructions that, when executed by a computing device implementing a self-organizing network (SON) engine performs operations comprising:
receiving network support node performance information indicative of performance of hardware or software component(s) of a network support node, the network support node being part of a support systems network that is configured to support a SON telecommunication network;
placing a plurality of messages that are to be sent to the network support node from a plurality of SON tools in a message queue;
determining that at least two messages in the message queue have different priorities; and
limiting transmission of the plurality of messages in the message queue to the network support node based at least in part on the network support node performance information and on the different priorities of the at least two messages.

13. The one or more non-transitory computer-readable media of claim 12, wherein the different priorities of the at least two messages are based on priorities of network parameters associated with the at least two messages.

14. The one or more non-transitory computer-readable media of claim 12, wherein the different priorities of the at least two messages are based on priorities of the SON tools that originated the at least two messages.

15. The one or more non-transitory computer-readable media of claim 12, wherein the plurality of SON tools are implemented by the SON engine of the computing device, the SON engine performing the receiving, the placing, the determining, and the limiting.

16. The one or more non-transitory computer-readable media of claim 12, wherein the network support node performance information is further indicative of performance of the support systems network.

17. The one or more non-transitory computer-readable media of claim 12, wherein the network support node performance information is received from a client component residing on the network support node or is retrieved by a component on the SON engine which remotely accesses the performance information from the network support node.

18. The one or more non-transitory computer-readable media of claim 12, wherein the limiting further comprises limiting the transmission of the plurality of messages when the network support node performance information fails to meet one or more thresholds or models.

19. The one or more non-transitory computer-readable media of claim 12, wherein the limiting further comprises transmitting a subset of the plurality of messages to the network support node, the subset including (i) one or more messages of the plurality of messages that each have a priority that meets or exceeds a priority threshold or (ii) one or more messages selected in order of priority until a collective size of the selected messages meets a size threshold.

20. The one or more non-transitory computer-readable media of claim 12, wherein the limiting comprises transmitting a subset of the plurality of messages to the network support node if the network support node performance information fails to meet a first threshold or preventing the transmission of the plurality of messages to the network support node if the network support node performance information fails to meet a second threshold.

* * * * *